United States Patent
Kaiser et al.

(10) Patent No.: US 11,311,146 B2
(45) Date of Patent: Apr. 26, 2022

(54) FIRE BASIN

(71) Applicants: Thomas Kaiser, Schrattenbach (DE); Christian Wassermann, Ebenhofen (DE)

(72) Inventors: Thomas Kaiser, Schrattenbach (DE); Christian Wassermann, Ebenhofen (DE)

(*) Notice: Subject to any disclaimer, the term of this patent is extended or adjusted under 35 U.S.C. 154(b) by 11 days.

(21) Appl. No.: 16/648,002

(22) PCT Filed: Sep. 17, 2018

(86) PCT No.: PCT/EP2018/000433
§ 371 (c)(1),
(2) Date: Mar. 17, 2020

(87) PCT Pub. No.: WO2019/052684
PCT Pub. Date: Mar. 21, 2019

(65) Prior Publication Data
US 2020/0275803 A1 Sep. 3, 2020

(30) Foreign Application Priority Data
Sep. 17, 2017 (DE) .................... 20 2017 004 811.6

(51) Int. Cl.
*A47J 37/07* (2006.01)
(52) U.S. Cl.
CPC ....... *A47J 37/0763* (2013.01); *A47J 37/0704* (2013.01); *A47J 37/0781* (2013.01); *A47J 37/0786* (2013.01); *A47J 2037/0777* (2013.01); *A47J 2037/0795* (2013.01)

(58) Field of Classification Search
CPC ............... A47J 37/0704; A47J 37/0763; A47J 2037/0777; A47J 37/0786; A47J 2037/0795; A47J 37/0781
See application file for complete search history.

(56) References Cited

U.S. PATENT DOCUMENTS

| | | | | |
|---|---|---|---|---|
| 2,085,238 | A * | 6/1937 | Towell | B65D 5/36 229/102.5 |
| 6,799,567 | B1 * | 10/2004 | Genest | A47J 37/0704 126/25 A |
| 10,888,195 | B1 * | 1/2021 | Norris | A47J 33/00 |
| 10,989,414 | B2 * | 4/2021 | Poggi | A47J 37/0763 |

(Continued)

FOREIGN PATENT DOCUMENTS

| | | |
|---|---|---|
| DE | 1 805 206 A1 | 6/1969 |
| DE | 20 2008 007 749 U1 | 8/2008 |
| KR | 2017-0017153 A | 2/2017 |

OTHER PUBLICATIONS

International Search Report and Written Opinion for corresponding Patent Application No. PCT/EP2018/000439 dated Jan. 17, 2019.

*Primary Examiner* — Alfred Basichas
(74) *Attorney, Agent, or Firm* — Renner, Otto, Boisselle & Sklar, LLP

(57) ABSTRACT

For a stable, easy-to-handle fire basin for burning wood and similar fuels, consisting of a plurality of segments (1a) which are supported on the ground with feet (2) and towards the top have a plurality of segment surfaces (1b) to form the tub-shaped fire basin (1), the invention proposes that the segment surfaces (1b) of the fire basin (1) also have or form concave depressions or recesses.

17 Claims, 2 Drawing Sheets

(56) References Cited

U.S. PATENT DOCUMENTS

Figure 1:
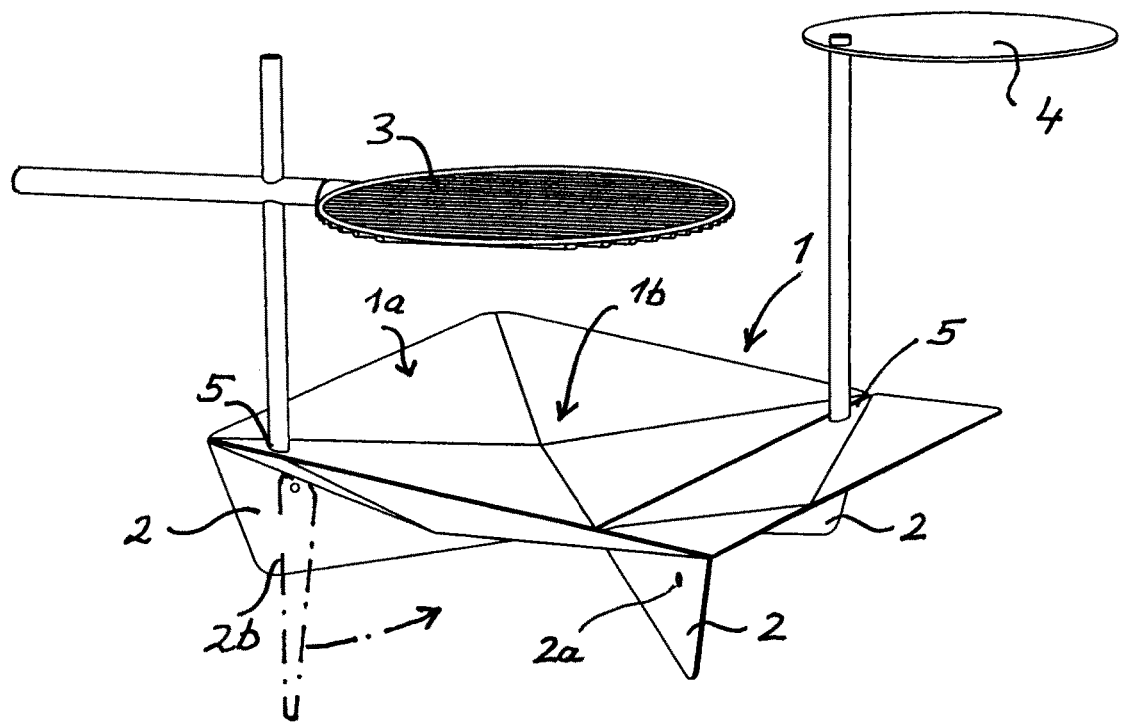

2011/0162634 A1    7/2011  Richard
2015/0136112 A1*  5/2015  Dyson ................ A47J 37/0704
                                                                               126/25 R
2021/0045578 A1*  2/2021  Stoltzfus ................ A47J 33/00

\* cited by examiner

FIRE BASIN

The invention relates to a fire bowl for the combustion of wood and similar fuels with the features of the preamble of claim 1.

Such fire bowls are used outdoors (garden, terrace, etc.) in the form of a mobile campfire. From DE 20 2008 007 749 U1, a fire bowl is known to which three feet can be screwed as a frame. The trough-shaped fire bowl consists of several sheet metal segments each of which comprises an overlap at one edge to screw the segments together (six screws are shown for three segments). This is relatively cumbersome and not very stable. Although the segments are made of sheet metal and are connected to form a semi-hollow spherical container according to claim 6, the stability especially in the area of the screw holes is low and the assembly of the segments is quite laborious. This also applies to the disassembly of the fire bowl, e.g. after the end of a garden party the next day, to transport it home by car, because the segments made of relatively thick sheet metal are relatively heavy. This thickness is often necessary due to the heat load in the fire bowl, to counteract warpage or bulging of the relatively large segment surfaces. The use of thin-walled metal sheets is therefore hardly possible so far, except when increasing the number of segments, which, however, increases the installation effort again accordingly.

Therefore such a fire bowl should be improved regarding stability and handling.

This task is solved by the features of claim 1. Advantageous implementations are subject of the subclaims.

The proposed fire bowl (brazier) can be produced cheaply and stable, especially of thin-walled sheet steel and, with the appropriate accessories, can also be used as an outdoor grill. Due to the integral construction of the segment surfaces with additional depressions or indentations at the preferably three segments of the fire bowl, the stability is considerably increased. The frame parts can be manufactured by simple folds in triangular form from sheet steel (blank). Starting from such a sheet metal blank (i.e. in flat form), intersecting bends can also be made to stabilize the fire bowl wall, so that each segment surface has in itself a slightly concave trough shape. In order to achieve this "depression", a wedge is cut out of the sheet metal blank, whereby a pretension is created in the center area. The segments can be anchored in a positive-fit manner by simply hooking in adjacent lugs in the center area.

By the mentioned bends on the segment surfaces the fire bowl is stiffened in the manner of a torispherical head and the individual segment surfaces are inherently dimensionally stable in the sense of an increased buckling stability. Therefore the fire bowl can be formed from thinner sheets and can be easily assembled and disassembled for transport. The individual segments (preferably three per fire bowl, whereas two or four or more segments are also possible) have a relatively low weight due to the folds, and can easily be screwed together (or connected in any other way), e.g. also with bayonet fasteners, toggle clasps or quick release fasteners to speed up the assembly or disassembly of the fire bowl for further transport. As these screws or quick release fasteners are outside the direct firing region, they do not get dirty and are easy to handle. Furthermore, for grilling purposes higher support feet can be screwed to the fire bowl which can easily be swivelled inwards if the lower position as a pure fire bowl is desired. Finally, the manufacturing costs are reduced considerably as the (few) segments can preferably be manufactured with a simple press or folding machine (also in different sizes). The "thin sheet" used as a blank can also be formed with low energy consumption, especially for the aforementioned concave depressions in the segment surfaces, so that—compared to the (geometrically flat) stretched surface—the forming process generally referred to as "pressing" results in corresponding structural profiles in the form of indentations, which increase the dimensional stability and buckling resistance, as is known per se from so-called membrane structures.

For transport (and cleaning if necessary) the fire bowl can be disassembled into the segments so that the individual parts fit into a car trunk, for example. Since the number of individual parts is relatively small despite the segment construction, this can be done quickly. In addition, these individual parts can hardly be lost or do not have to be searched for long when (re)assembling the fire bowl. Thus a quick firing is achieved, which can also be used for grilling purposes. A grilling grate or a table top can be attached or inserted to the edge of the fire bowl, especially for food or grilling accessories.

Figure 2:
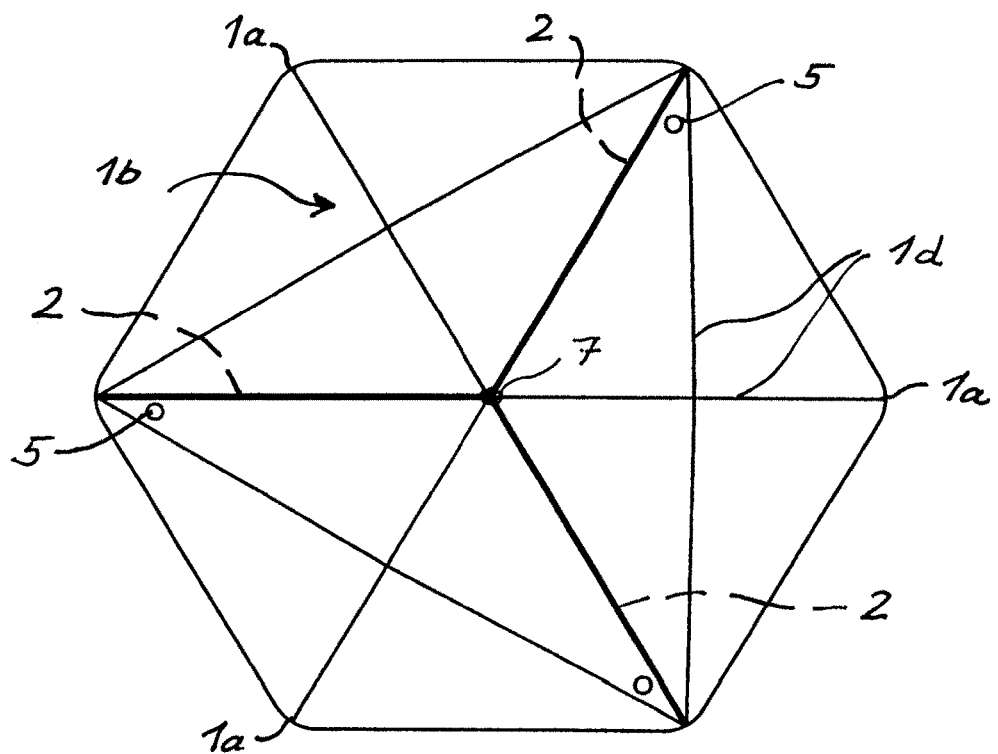
Figure 3:
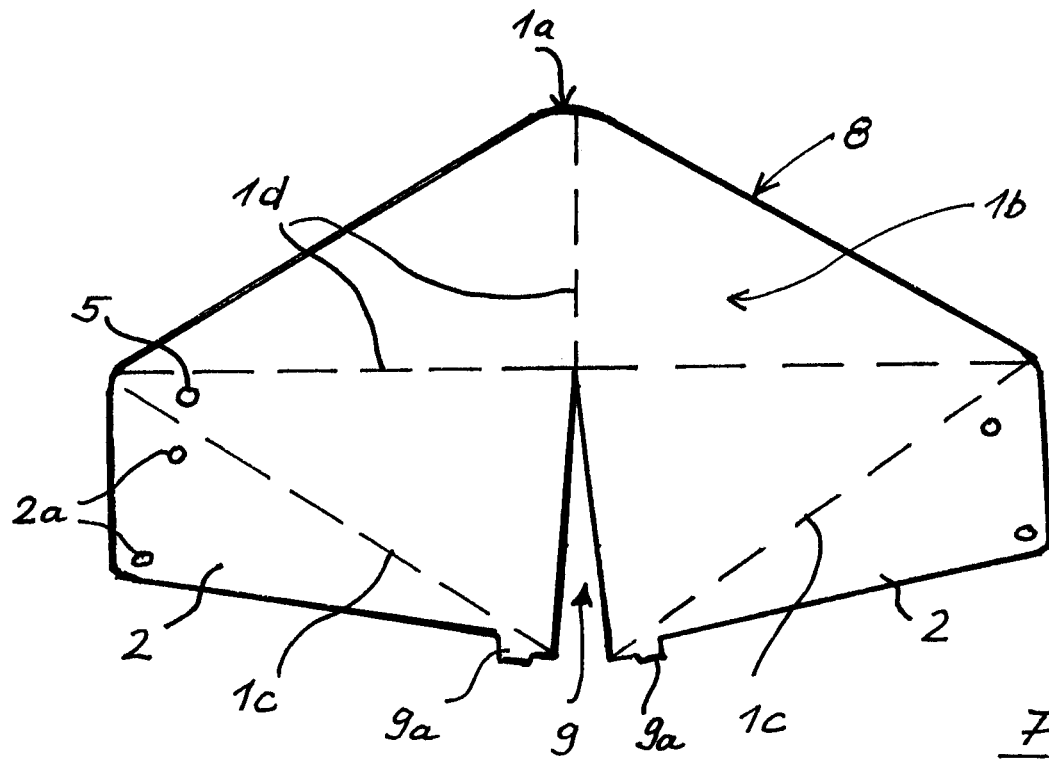

Further advantages of the invention result from the following description of an implementation example based on the drawings. The figures show:

FIG. 1 a perspective view of a fire bowl in operating position,

FIG. 2 a top view of the fire bowl according to FIG. 1,

FIG. 3 a flat view of a sheet metal blank for a fire bowl segment, and

Figure 4:
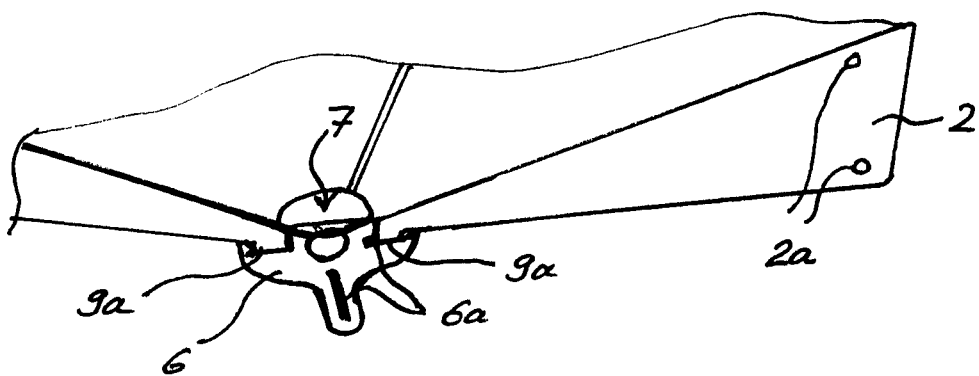

FIG. 4 a perspective view of the central area of the fire bowl.

FIG. 1 shows a fire bowl 1 for wood or similar fuels (e.g. barbecue coal) and consists of three identical segments 1a, which are joined together at a central angle of 120° to form a downwardly closed trough. This fire bowl 1 of (here) three segments 1a is supported on the floor with its (three) segment surfaces 1b via (three) feet 2, which together with the segments 1a are formed in one piece from sheet metal blanks 8 (cf. FIG. 3), preferably in triangular form by means of corresponding folds (along the fold lines 1c of sheet metal blank 8 in FIG. 3). This can easily be done on a folding machine, so that no separate support feet have to be manufactured. This "integrated" construction also increases the stability of the fire bowl 1, so that grilling accessories, especially a grilling grate 3 and/or a table top 4 can be attached to it. This is done in a simple way with insertion openings as fastenings 5 at the respective segment 1a (see FIG. 2 in the edge area), which are incorporated during the cutting process (see FIG. 3). In addition to punching, this can also be done by laser cutting or water jet cutting. For barbecue operation for a more comfortable working height, support feet 2b can also be attached which are indicated by dotted lines and which can easily be folded inwards towards the center of the fire bowl 1 underneath it.

The connection of the (three) segments 1a and thus formation of the fire bowl 1 with (here) three segment surfaces 1b pointing upwards is preferably performed at the upright standing foot parts, namely by means of at least one hole 2a each, into which e.g. screws can be inserted, but preferably quick release fasteners are inserted to accelerate the assembly and disassembly of the fire bowl 1. In particular, such quick release fasteners (such as bayonet fasteners or toggle clasps) are captively attached to the feet 2. This connection at two opposite foot parts, respectively, to a foot 2 has the advantage that this foot section is hardly contaminated by fire or soot and therefore the fasteners or screws are easy to loosen. This also applies to the support feet 2d which are provided as accessories, if necessary, and which can also be mounted at the respective upper hole 2a with quick release fasteners and which, when in the folded out support position, project slightly outwards to form a stable anchorage above a dead center.

As shown in FIG. 2 in top view, each segment 1a (here the respective outer corner is marked with this reference sign) of the fire bowl 1 has intersecting bends 1d, which intersect in the middle of each of the (here) three segment surfaces 1b. As a result, the—in top view—diamond-shaped surface of each segment surface 1b has an additional concave depression so that the dimensional stability and buckling resistance is increased. Feet 2 are concealed here in top view, but are indicated in thicker lines, as these are each formed by two foot parts, as described using the holes 2a.

FIG. 3 shows a flatly spread sheet metal blank 8 for a segment 1a of fire bowl 1. After the circumference has been cut to size, e.g. by means of laser or water jet, it can be folded several times on a folding machine, namely along lines 1d to form the stabilizing depression (concave trough) and along lines 1c to form the two foot parts, which are bent backwards by approx. 90° each perpendicular to the drawing plane to form a foot 2 each when assembling the segments 1a. The holes 2a and insertion openings 5 are also inserted. It is essential for the formation of the above-mentioned concave depression by the intersecting bends 1d that a wedge 9 is cut out of the (flat) sheet metal blank 8, so that when the two edges of the wedge are brought together in conjunction with the bends 1d, the sheet metal is "automatically" pressed into the desired concave shape.

Two lugs 9a, which are adjacent to the (cut free) wedge 9, are also advantageous. In the folded state, i.e. with the foot parts upright, the two lugs 9a are next to each other and can be inserted into a centering part 6 located in the center of fire bowl 1, as schematically shown in FIG. 4. The star-shaped centering part 6 has several radial slots 6a for this purpose of which the width corresponds exactly to (or slightly more than) the thickness of the sheet metal blank 8. In this way, segments 1a are tightly clamped and anchored in the central area of the fire bowl 1. Preferably a small cover plate 7 (see also FIG. 2) can be provided above the centering part 6, which can also be screwed or clamped to the centering part 6 to cover the tips of the three segments 1a close to the center. In this way also manufacturing tolerances can be compensated and it can be securely prevented that dirt or remnants of embers can escape from the lowest part of the fire bowl 1.

Although the structure of the fire bowl 1 has been described here using three identical segments 1a, a different number, e.g. four segments 1a, is also possible, namely with a center angle of 90°. The alignment of the radial slots 6a for the engagement of the lugs 9a is then adjusted accordingly, i.e. the centering part 6 would have four teeth, whereby the radial slots 6a would be aligned at an angle of 90° from each other.

The invention claimed is:

1. A fire bowl for the combustion of wood and similar fuels, comprising a plurality of segments which are supported on the ground with feet and have a plurality of segment surfaces towards the top to form the trough-shaped fire bowl, wherein each segment surface of the fire bowl additionally has a concave trough, wherein the segment surfaces have intersecting bends for forming the troughs, and wherein each segment is formed from a sheet metal blank, wherein a wedge is cut out of each sheet metal blank and wherein the two edges of each wedge are brought together to form the concave trough and wherein each wedge ends with its tip at the intersection of the bends.

2. The fire bowl of claim 1, wherein each segment is formed from a sheet metal, wherein a wedge is cut out of each sheet metal blank and wherein the two edges of each wedge are brought together to form the concave trough.

3. The fire bowl of claim 2, wherein each sheet metal comprises a foot which is formed in one piece from the sheet metal blank.

4. The fire bowl of claim 3, wherein each foot has a triangular form.

5. The fire bowl of claim 1, characterized in that the feet are each designed as triangular-shaped folds of a sheet metal blank.

6. The fire bowl of claim 1, wherein the connection of the segments to the fire bowl is provided at the feet.

7. The fire bowl of claim 1, wherein for connecting the segments quick-release fasteners are provided at holes.

8. The fire bowl of claim 7, wherein the quick-release fasteners are captively attached to the feet.

9. The fire bowl of claim 7, wherein the quick-release fasteners are configured as bayonet or toggle fasteners.

10. The fire bowl of claim 1, wherein fastenings for grilling accessories are provided on the fire bowl.

11. The fire bowl of claim 1, wherein a grilling grate and/or a table top are provided on the fire bowl.

12. The fire bowl of claim 10, wherein the fastenings are shaped as insertion openings on the respective segment.

13. The fire bowl of claim 1, wherein the segments are positively clamped in the central area of the fire bowl.

14. The fire bowl of claim 13, wherein the segments are positively clamped on a centering part with radial slots for engagement of lugs.

15. A method of manufacturing a fire bowl for the combustion of wood and similar fuels, wherein the fire bowl comprises a plurality of segments which are supported on the ground with feet and have a plurality of segment surfaces towards the top to form a trough-shaped fire bowl, wherein each segment surface of the fire bowl additionally has a concave trough, wherein the segment surfaces have intersecting bends for forming the troughs, and wherein each segment is formed from a sheet metal blank, and wherein the manufacture of each segment comprises bending a sheet metal blank several times along lines to form a stabilising trough after cutting the periphery on a bending machine, a wedge being cut out of the sheet metal blank so as to form a concave trough by bringing together the edges of the wedge, and wherein the wedge ends with its tip at the intersection of the bend.

16. The method of claim 15, wherein the sheet metal blank is bent on the bending machine along lines for forming foot parts, the foot parts being bent through approximately 90° so that they each form a foot when the segments are assembled.

17. The method of claim 16, wherein perforations and insertion openings are made in the sheet metal blank.

* * * * *